United States Patent [19]
Coillet

[11] 4,161,446
[45] Jul. 17, 1979

[54] PROCESS FOR THE TREATMENT OF GROUND WATER

[76] Inventor: Dudley W. Coillet, 12 Ross Rd., Belmont, Mass. 02178

[21] Appl. No.: 854,406

[22] Filed: Nov. 23, 1977

[51] Int. Cl.² .............................................. B01D 13/00
[52] U.S. Cl. .................................. 210/23 H; 210/32; 210/34; 210/181; 210/182; 210/186
[58] Field of Search ...................................... 210/21–23, 210/24, 26, 27, 30 R, 32, 34, 181, 182, 186, 195 R, 321

[56] References Cited
U.S. PATENT DOCUMENTS 3,639,231   2/1972   Bresler ........................ 210/30 R X

FOREIGN PATENT DOCUMENTS 59441  11/1967  Australia .................................... 210/32
55558  11/1974  Australia .................................... 210/32

*Primary Examiner*—Ferris H. Lander
*Attorney, Agent, or Firm*—Flehr, Hohbach, Test, Albritton & Herbert

[57] ABSTRACT

Ground water which is high in impurity content such as silica, hardness, sulfates, alkalinity, etc., may be made potable by treating the water with thermal ion exchange desalination resins and a reverse osmosis system. The heat which is present in the ground water is utilized to thermally regenerate the ion exchange resin.

3 Claims, 1 Drawing Figure

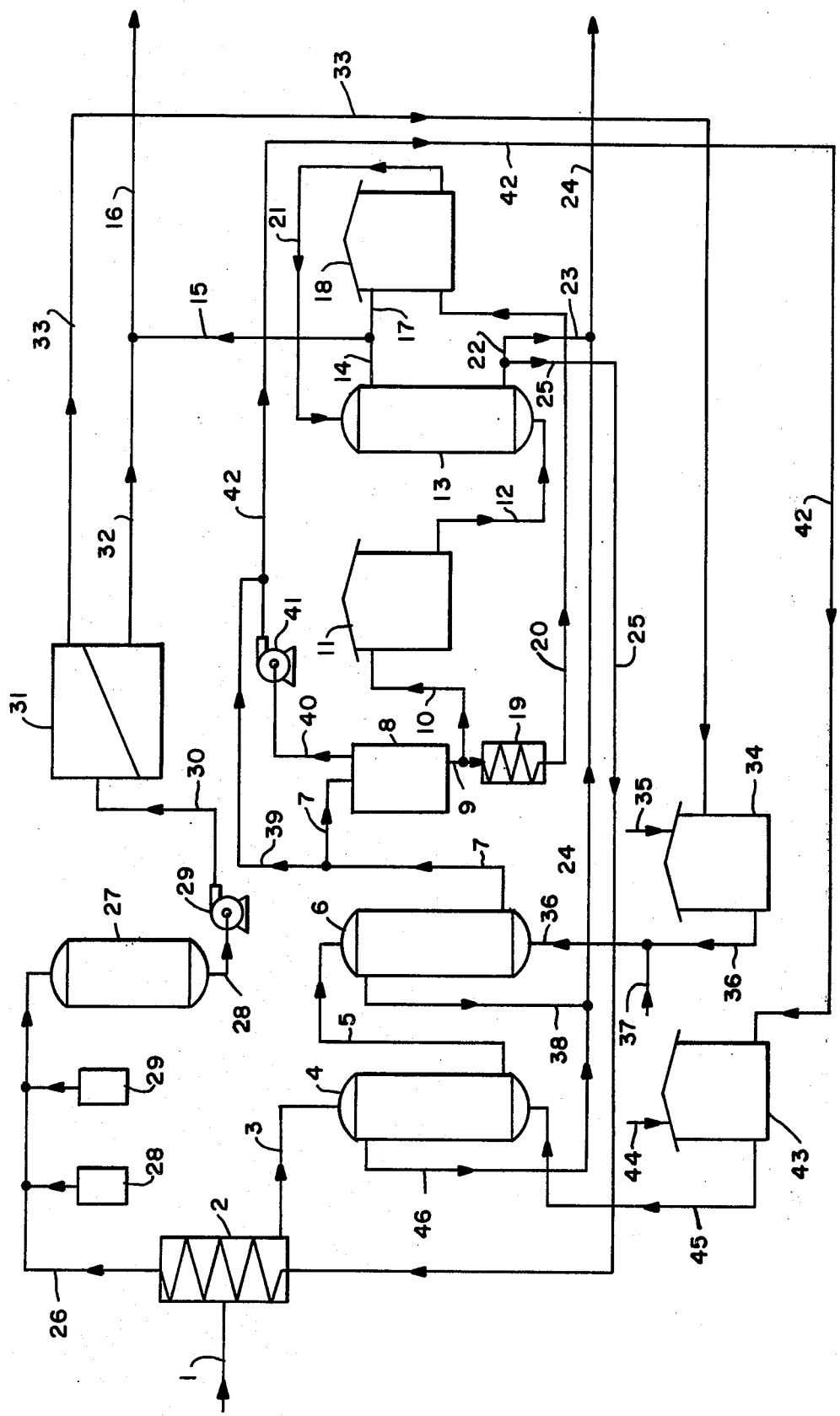

PROCESS FOR THE TREATMENT OF GROUND WATER

Ground water in certain areas of the world possesses a relatively high degree of contamination and is unfit for drinking. In addition this water in certain areas or regions also possesses a relatively high temperature which is due to geothermal heat contained therein. The high temperature and the high degree of contamination which is due to the presence of silica, various sulfates, hardness, as well as high alkalinity must be removed or subjected to treatment to render the resulting water potable. The potability of the water is obtained by treating the source with an ion exchange resin system, and the regenerant obtained in the process through a reverse osmosis system. However, the high temperature of the regenerant water due to the geothermal heat contained therein must be removed before treating the same in the reverse osmosis system. This is due to the fact that high temperatures will limit the life of some semi-permeable membranes by reducing the effectiveness of the membrane to remove salts.

One inherent disadvantage of desalinating the ground water by passing the same through a thermal ion exchange desalination resin is that the resin will, after a period of time, lose its effectiveness due to the deposition of salts on the surface of the resin. Therefore, the resin must be regenerated by passing a regenerant over the surface of the resin. For certain classes of resin hereinafter described this may be done using water at a relatively high temperature. It has now been discovered that the geothermal heat which is present in the ground water may be removed therefrom and used to heat the regenerant which is subsequently passed over the thermal ion exchange resin to remove the unwanted salts therefrom, thus rendering the ion exchange resin active for further treatment of the desired product water.

It is therefore an object of this invention to provide a process for obtaining potable water from a water source which contains contaminants therein.

A further object of this invention is to provide a process for treating ground water which is recovered at a relatively high temperature in a manner whereby said ground water is rendered potable.

In one aspect an embodiment of this invention resides in a process for the obtention of potable water involving the conjunctive use of ion exchange and reverse osmosis system to treat a water source containing contaminants therein by passing said water source through a bed of thermal ion exchange desalination resin which is subsequently regenerated by hot water and thereafter passing the used regenerant from the regeneration of said resin through a reverse osmosis membrane to remove said contaminants, the improvement which comprises utilizing the heat which is present in said water source to thermally regenerate said ion exchange desalination resin.

A specific embodiment of this invention is found in a process for the obtention of potable water in which a water source such as ground water which contains geothermal heat is passed through a bed of anion exchange resin and a bed of cation exchange resin prior to treatment by passage over a thermal ion exchange desalination resin, regenerating the latter as described hereinbefore thereafter passing the used regenerant through heat removal means and passing the used regenerant through a reverse osmosis membrane to increase the yield of potable product, the heat which is removed from the ground water being used to thermally regenerate the ion exchange desalination resin.

Other objects and embodiments will be found in the following further detailed description of the present invention.

As hereinbefore set forth the present invention is concerned with a process for the desalination of water containing contaminants. The desalination of the ground water is accomplished by subjecting the water source to a process which involves the conjunctive use of an ion exchange system and a reverse osmosis system to remove the undesired contaminants which are present in said water. The inventive feature of this process lies in the use of the heat such as geothermal heat which is normally present in the ground water source to thermally regenerate the ion exchange desalination resin when the resin becomes contaminated by the presence of salts and is thus rendered ineffective to remove unwanted elements or compounds which are present in the water. The process for the desalination of a ground water source is effected by charging the ground water source which is at an elevated temperature due to the geothermal heat contained therein to an anionic resin filter followed by treatment with a cationic exchange resin. The treatment with the anionic resin which may be of the Amberlite variety such as IRA-68 will separate sulfate rich effluent followed by treatment with a weakly acidic primarily cationic exchange resin such as Amberlite IRC-84 which will tend to remove the compounds such as the calcium and magnesium salts and convert the alkalinity to carbon dioxide. The carbon dioxide and dissolved oxygen is then stripped out by passage through a vacuum degasser which may be operated at a pressure of about 100 mm to remove the carbon dioxide and oxygen followed by passage of a portion of the water source to a (feed) storage element. A portion of the degassed water source may be passed through a heat exchanger to raise the temperature of the water source to a range of from about 60° to about 95° C., this heated water source passing to a second (thermal) storage apparatus for use as a regenerant in a subsequent step of the operation. The ground water source which is contained in the feed storage apparatus is then passed through a filter of ion exchange resin (such as Rohm & Haas XD-2 or Diamond-Sirotherm TR-10) capable of regeneration with hot water, for desalination and after passage through the resin bed may be withdrawn and used as a portion of a potable product water blend hereinafter described in greater detail. In the event that the thermal ion exchange desalination resin becomes ineffective due to deposition of salts on the resin it may then be regenerated by passage through it of a portion of the water at an elevated temperature in the thermal storage apparatus hereinbefore mentioned which was removed from the degasser and passed through the heat exchanger. The portion which is heavily contaminated with undesirable salts goes to waste while the portion which is less heavily contaminated is withdrawn and passed through a heat exchanger where it is cooled by the water source. After withdrawal from the heat exchanger the water source may optionally then be treated with an inhibitor such as sodium hexametaphosphate to inhibit the deposition of insoluble salts such as calcium, sulfate, silica, etc., and treated with an acid to adjust the pH within a desired range (e.g. 5 to 6.5) at which the water source can be treated in a reverse osmosis system. The water source is then passed through a filter to remove solids which may have an adverse effect on the semi-permeable reverse osmosis membrane. Following this the water source is passed through a heat pump which will extract residual geothermal heat present in the water source, said geothermal heat being recycled to the thermal storage apparatus while the cooled water is subjected to treatment with a reverse osmosis system at an elevated pressure usually in the range of from about 500 to about 1000 psi and at a substantially atmospheric temperature. The semi-permeable reverse osmosis membranes which are utilized in the system may comprise any of those which are known in the art including membranes made from the cellulose acetates such as cellulose triacetate, cellulose diacetate, etc., polyethyleneimines which have been reacted with a polyfunctional reagent, epiamines which have been reacted with a polyfunctional reagent, etc., said membranes being deposited on a porous support material such as polysulfones, polyvinyl chloride, etc. After passage through the reverse osmosis system the permeate is recovered and used in the potable water product blend while the brine portion of the system is recycled and utilized as a regenerant for the weakly acidic primarily cationic exchange resin hereinbefore mentioned. It is to be understood that the semi-permeable membranes as well as the particular anionic and cationic exchange resins hereinbefore set forth are only representative of the type of compounds which may be employed and that the present invention is not necessarily limited thereto.

As hereinbefore set forth the regeneration of the thermally regenerated ion exchange resin is accomplished by treating the resin with the regenerant comprising, but not limited to, the ground water source at an elevated temperature, the temperature of said regenerant being in a range of from about 60° C. to about 98° C.

It is, therefore, apparent that, by utilizing the particular flow of the present invention, it is possible to cool the water source by removal of the geothermal heat contained therein thus permitting the water source to be charged to a reverse osmosis system without subjecting the integrity of the semi-permeable membranes to injurious forces which would lessen the ability of the membranes to remove the unwanted contaminants from the ground water source.

BRIEF DESCRIPTION OF THE DRAWING

The present invention will be further illustrated with reference to the accompanying drawing which sets forth a flow diagram of the process of the invention. It is to be understood that various valves, pumps, etc., have been eliminated as not being essential to the complete understanding of the invention. However, the utilization of these, as well as other similar appurtenances, will become obvious as the drawing is described.

Referring now to the drawing a feed stream of water which contains a high degree of salinity as well as other undesired contaminants, an example of this feed source being ground water which contains a relatively high amount of geothermal heat and is at a relatively high temperature compared to that of the atmosphere, is charged through line 1 to a heat exchanger 2. The feed is withdrawn from heat exchanger 2 to line 3 and passed to a filter 4 which contains an anionic ion exchange resin, in part at least in the bicarbonate form. After passage through filter 4 the feed is passed through line 5 to a second filter 6 which contains a weakly acidic primary cation ion exchange resin, in part at least in the sodium form. After passage through the resin bed the charge is withdrawn through line 7 and a major portion of the water is charged to a vacuum degassifier 8. The degassification of the water is necessary inasmuch as the alkalinity which was present in the water source has been converted to carbon dioxide by passage through filters 4 and 6 previously mentioned, and inasmuch as the water may contain dissolved oxygen which may be injurious to its subsequent processing, particularly through thermally regenerated ion exchange resins. The vacuum degassification of the water feed is effected at a pressure of approximately 100 mm Hg. After passage through degassifier 8 the water feed is withdrawn through line 9 and a major portion is passed through line 10 to a feed storage apparatus 11. From feed storage apparatus 11 the feed is withdrawn through line 12 and passed into filter 13 which contains thermally regenerated ion exchange resin. The feed is filtered through the thermal ion exchange desalination resin in filter 13 and is withdrawn through lines 14, 15 and 16 for storage as a component of the final potable water product. However, due to the desalination of the water feed the thermal ion exchange desalination resin will become contaminated and lose its effectiveness. When this occurs a valve, not shown in the drawing, will be activated and the feed will be passed through line 17 to a thermal storage unit 18 for use as a portion of the regenerant. The portion of the water feed which was withdrawn from degassifier 8 through line 9 will pass through heat exchanger 19 wherein it will be heated by means of flue gas to a temperature in a range of from 60° to about 98° and is withdrawn from heat exchanger 19 through line 20 and passed into thermal storage unit 18. In the regeneration cycle for the resin the regenerant which is maintained at this elevated temperature will pass through line 21 to the top of filter 13 and pass therethrough preferably in a downflow to thermally regenerate the ion exchange desalination resin contained therein. After removing the unwanted compounds from the resin, the effluent is withdrawn through line 22 at the bottom of filter 13 and a portion is passed through lines 23 and 24 for disposal as waste. Another portion which is relatively low in contaminants is withdrawn through line 25 to heat exchanger 2. From heat exchanger 2 this water stream is then withdrawn through line 26 to filter 27. At intermediate points between heat exchanger 2 and filter 27 the feed stream is optionally injected with an inhibitor from source 28 to inhibit the deposition of insoluble salts and also injected with an acid such as hydrochloric acid from source 29 to adjust the pH to a range of from about 5 to about 6.5 in order that the semi-permeable membrane in the reverse osmosis unit will reject salt in an effective manner. After passage through filter 27 in which finely dispersed solids are removed, the water source is withdrawn through line 28 and passed through pump 29. Before or after pump 29 the residual heat is extracted from the water source and passed to thermal storage unit 18 through a heat pump system, not shown in the drawing. After withdrawal from pump 29 through line 30 the feed source is subjected to a reverse osmosis treatment by passage through a semi-permeable membrane in system 31, the treatment in the reverse osmosis system being effected at an elevated pressure in the range of from about 500 to about 1000 psi and at substantially atmospheric temperatures. After treatment in the reverse osmosis system the permeate is withdrawn through line 32 and blended with the product potable water produced in filter 13 which was withdrawn through lines 14, 15 and 16. An alkali (such as sodium hydroxide) may be added for pH adjustment to neutrality or any other desired value of pH of the final potable product water. The brine or concentrate from the reverse osmosis system is withdrawn through line 33 for utilization as a regenerant for the ion exchange resin bed in filter 6. The regenerant is admixed in storage unit 34 with an additional amount of sodium chloride which is charged thereto through line 35 and after admixture is withdrawn through line 36, admixed with an alkali such as sodium hydroxide solution which is charged through line 37 to adjust the pH to the required value of about 7 and charged to filter 6 through line 36. After regeneration by an upflow through filter 6 the waste material is withdrawn through line 38 to line 24 and passed for waste disposal. While the major portion of the water source which was withdrawn from filter 6 through line 7 passed to degassifier 8, a minor portion is withdrawn through line 39 and admixed with the carbon dioxide which was stripped from the water source in degassifier 8 and withdrawn through line 40 and passed through or around pump 41. The carbon dioxide and water source in line 39 are combined in line 42 and passed to a second storage unit 43. In storage unit 43 the water source containing carbon dioxide is utilized to acidulate sodium carbonate which is charged to storage unit 43 through line 44. After acidulation to the bicarbonate form, the mixture is withdrawn through line 45 and passed to filter 4 for use in the regeneration of the anionic ion exchange resin. Upon completion of the regeneration of the resin bed the waste is withdrawn through line 46 and passed to waste disposal through line 24.

The following example is given for the purpose of illustrating the process of this invention. However, it is to be understood that this example is given merely for purposes of illustration and is not intended to limit the generally broad scope of the present invention in strict accordance therewith.

EXAMPLE I

A charge of ground water which is high in silica, sulfate, alkalinity and hardness (such as calcium and magnesium) and which is at a temperature of 40° C., may be charged to a heat exchanger and after passage therethrough may be withdrawn and passed to a filter containing an anionic exchange resin known in the trade as Amberlite IRA-68. The ground water is passed through this filter at a rate of 10 gal/hr. to 10 million gal/hr. After passage through the filter which is effected at a temperature of approximately 30° to 45° C., the water is withdrawn and passed through a second filter which contains a weakly acidic cation exchange resin known in the trade as Amberlite IRC-84. This passage through the resin is also effected at a rate of 10 gal/hr. to 10 million gal/hr. and a temperature of 30° to 45° C. After passage through the cation exchange resin the ground water may be withdrawn and passed to a degassifier where the carbon dioxide which was formed during the passage of the ground water through the filters and any dissolved oxygen such as that originally present in the feed is stripped utilizing a vacuum pressure of about 100 mm Hg. After passage through the degassifier, the ground water may be collected in a tank and utilized as feed storage for thermal ion exchange desalination. The thermal ion exchange desalination may be effected by passing the ground water from the storage through a bed of thermally regenerable ion exchange resin known in the trade as Rohm & Haas XD-2, or Diamond Shamrock TR-10 or TR-20, the flow rate of the feed being 5 gal/hr. to 7 million gal/hr. while maintaining a temperature of 10° to 40° C. After passage through the ion exchange resin in an upward flow the desalinated water may be withdrawn and passed to storage as one of the components of a potable product water. When the thermal ion exchange resin becomes contaminated with the salts it may be regenerated by utilizing a portion of the feed stock which has been passed through a heat exchanger from the degassification zone, said water being heated to a temperature in a range of from about 60° to about 98° C. during passage through the heat exchanger and afterwards in a storage vessel using heat pumped from the contents of a feed storage vessel using a heat pump system. The heated water is charged to a thermal storage unit and additionally heated by the heat taken from water prior to charging the water to a reverse osmosis unit using a heat pump system and/or optionally by that taken in like manner from the feed storage vessel. The regenerant may be passed from the thermal storage unit through the thermal ion exchange resin in a downflow to purge the salts therefrom. Any portion which is contaminated with undesirable salts may be withdrawn and passed to waste disposal while all remaining portions which are relatively free of undesirable contaminants may be recycled back through the heat exchanger utilized to treat the raw feed and after passage therethrough may be injected with an inhibitor such as sodium hexametaphosphate and acid material such as hydrochloric acid to adjust the pH of the water to a range of from 5 to about 6.5 The treated water may then be passed through a filter to remove fines and solids and thereafter through a heat pump wherein any residual heat is extracted and sent to the thermal storage unit for heat enhancement of the regenerant previously mentioned which is used to regenerate the thermal ion exchange resin which is a thermally regenerable resin of which examples mentioned hereinbefore are typical. After extraction of residual heat the ground water is then passed through a reverse osmosis system in which it passes through a semi-permeable membrane comprising a polyethyleneimine which has been treated with a polyfunctional reagent such as isophthaloylchloride to form a film, said film being composited on a polysulfone support. The reverse osmosis treatment may be effected at elevated pressures ranging from about 500 to about 1000 psi and at substantially atmospheric temperature. The permeate which is recovered after passage of the water through the membrane may be removed to storage as a component of a potable product, while the concentrate or brine may be recycled and admixed with sodium chloride. This mixture may then be treated with an alkali such as sodium hydroxide to adjust the pH of the solution, and utilized to regenerate the weakly acidic primary cation exchange resin bed in the sodium form which is present in the second filter unit. In like manner the carbon dioxide which has been stripped from the ground water in the degassifier may also be recycled and utilized to acidulate the contents of a storage vessel to produce sodium bicarbonate, the mixture then being used to regenerate the anionic exchange resin which is present in the first filter unit. Oxygen which may be mixed with the carbon dioxide is mostly discharged from the vent on the top of the storage vessel.

In addition to the component streams of potable product water hereinbefore mentioned, there will be required the admixture of an alkali (such as sodium hydroxide) or the removal of an acid (such as hydrochloric acid) to ensure that residual acidity is consistent with potable standards. Methods of sterilization well known in the art (such as those employing chlorine or an ozone admixture) will also in general apply to the product.

I claim as my invention:

1. A process for forming potable water from a salt-containing water source comprising the steps of
   (a) passing water from said water source as a stream through a bed of thermal ion exchange desalination resin to form a potable water stream,
   (b) periodically thermally regenerating said desalination resin by passing a preheated regenerant stream of higher temperature than said water source through said resin bed,
   (c) passing said water source stream prior to step (a) and the regenerant water stream resultant from step (b) through a heat exchange zone in which said regenerant water stream is cooled and said water source is heated, and
   (d) passing said cooled regenerant water stream through a reverse osmosis membrane zone to form a permeate for use as potable water.

2. The process of claim 1 in which said water source is ground water.

3. The method of claim 2 in which said water source heated in step (c) comprises at least a portion of the preheated regenerant stream supplied to said resin bed.

* * * * *